US011803229B1

(12) United States Patent
Yung et al.

(10) Patent No.: US 11,803,229 B1
(45) Date of Patent: Oct. 31, 2023

(54) TRIMMING VOLTAGE PROVIDED BY A POWER SUPPLY UNIT TO AN INFORMATION HANDLING SYSTEM TO REDUCE POWER CONSUMPTION AT THE INFORMATION HANDLING SYSTEM

(71) Applicant: Dell Products L.P., Round Rock, TX (US)

(72) Inventors: Su Chun Yung, New Taipei (TW); Ming Chia Chuang, New Taipei (TW); Yung-Chang Chang, New Taipei (TW); Hsieh Ya Tang, New Taipei (TW); Edward Douglas Knapton, Pflugervile, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/661,360

(22) Filed: Apr. 29, 2022

(51) Int. Cl.
  *G06F 1/00* (2006.01)
  *G06F 1/3296* (2019.01)
(52) U.S. Cl.
  CPC .................................. *G06F 1/3296* (2013.01)
(58) Field of Classification Search
  CPC .................................................... G06F 1/3296
  See application file for complete search history.

(56) References Cited

U.S. PATENT DOCUMENTS 10,090,688 B2\* 10/2018 Houston ................. H02J 7/007
2016/0204631 A1\* 7/2016 Houston ................. H02J 7/007
  320/162
2021/0006087 A1\* 1/2021 Tian .................... H02J 7/00304

\* cited by examiner

*Primary Examiner* — Nitin C Patel
(74) *Attorney, Agent, or Firm* — McDermott Will & Emery LLP

(57) ABSTRACT

Controlling power consumption at an IHS, including receiving electrical power associated with an initial voltage at a first time; determining that the IHS is to enter a low-power state, and in response: adjusting an UVP parameter for the electrical power from a first voltage to a second voltage, the second voltage less than the first voltage, the second voltage based on the low-power state; adjusting an OCP parameter for the electrical power from a first amperage to a second amperage, the second amperage less than the first amperage, the second amperage based on the low-power state; trimming the initial voltage of the electrical power to a trimmed voltage, the trimmed voltage less the initial voltage and greater than the second voltage; adjusting the power state of the IHS to the low-power state; receiving the electrical power having the trimmed voltage at a second time after the first time.

16 Claims, 4 Drawing Sheets

TRIMMING VOLTAGE PROVIDED BY A POWER SUPPLY UNIT TO AN INFORMATION HANDLING SYSTEM TO REDUCE POWER CONSUMPTION AT THE INFORMATION HANDLING SYSTEM

BACKGROUND

Field of the Disclosure

The disclosure relates generally to an information handling system, and in particular, controlling power consumption at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, energy conservation and carbon reduction have become an important policy in the world by enhancement of environmental protection consciousness and global climate warming problem.

SUMMARY

Innovative aspects of the subject matter described in this specification may be embodied in a method of controlling power consumption at an information handling system, the method comprising: receiving, at a voltage regulator module of the information handling system, electrical power from a power supply unit (PSU), the electrical power associated with an initial voltage at a first time; determining that the information handling system is to enter a low-power state; in response to determining that the information handling system is to enter the low-power state: adjusting, by a voltage regulator module at the information handling system, an undervoltage protection (UVP) parameter for the electrical power provided to the voltage regulator module from a first voltage to a second voltage, the second voltage less than the first voltage, the second voltage based on the low-power state; adjusting, by the PSU, an overcurrent protection (OCP) parameter for the electrical power from a first amperage to a second amperage, the second amperage less than the first amperage, the second amperage based on the low-power state; trimming, by the PSU, the initial voltage of the electrical power to a trimmed voltage, the trimmed voltage less the initial voltage and greater than the second voltage; adjusting the power state of the information handling system to the low-power state; and receiving, at the voltage regulator module and when the information handling system is in the low power state, the electrical power having the trimmed voltage at a second time after the first time.

Other embodiments of these aspects include corresponding systems and apparatus.

These and other embodiments may each optionally include one or more of the following features. For instance, the low-power state is an advanced configuration and power interface (ACPI) S3 state. The low-power state is an advanced configuration and power interface (ACPI) S5 state. The trimmed voltage is less than the first voltage. Adjusting the power state of the information handling system includes adjusting the information handling system from an advanced configuration and power interface (ACPI) S0 state to the low-power state. After adjusting the power state of the information handling system, further comprising: determining that the information handling system is to enter a working power state; in response to determining that the information handling system is to enter the working power state: adjusting, by the PSU, the OCP parameter for the electrical power from the second amperage to the first amperage, the first amperage based on the working power state; adjusting, by the voltage regulator module, the UVP parameter for the electrical power from the second voltage to the first voltage, the first voltage based on the working power state; adjusting, by the PSU, the trimmed voltage of the electrical power to the initial voltage, the initial voltage based on the working power state; adjusting the power state of the information handling system to the working power state; and receiving, at the voltage regulator module, the electrical power having the initial voltage at a third time after the second time. After adjusting the OCP parameter, comparing a duty cycle of a signal representing the power state of the information handling system to a time threshold; and determining, based on the comparing, that the duty cycle of the signal is greater than the time threshold, and in response, adjusting the UVP parameter for the electrical power from the second voltage to the first voltage. Determining, based on the comparing, that the duty cycle of the signal is less than or equal to the time threshold, and in response, maintaining the low-power state of the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
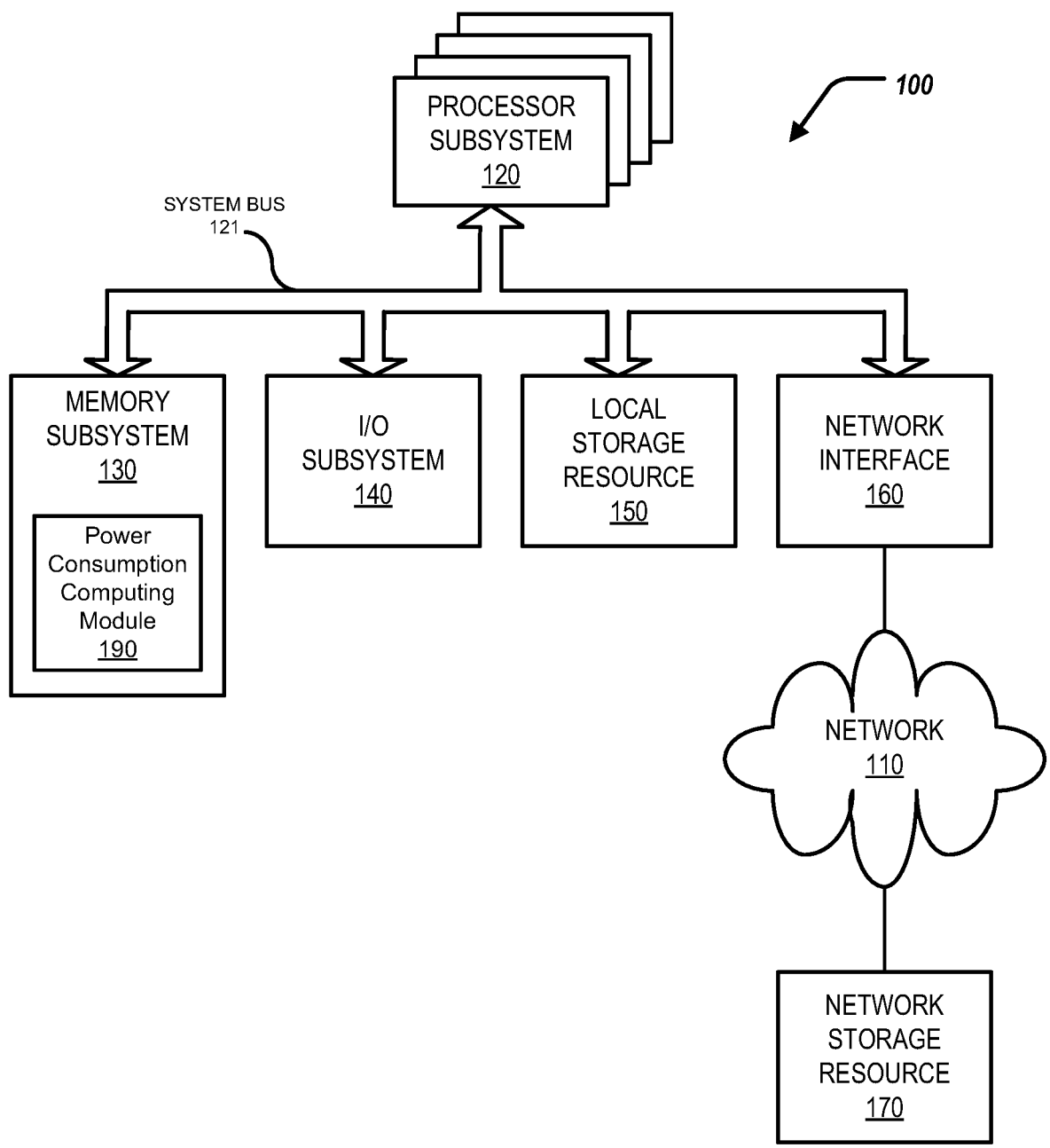
FIG. 1 is a block diagram of selected elements of an embodiment of an information handling system.

This disclosure discusses methods and systems for controlling power consumption of an information handling system. In short, parameters such as an undervoltage protection (OVP) and overcurrent protection (OCP) associated with the information handling system and a power supply unit (PSU) providing power to the information handling system can be adjusted. As such, the voltage provided by the PSU to the information handling system can be trimmed, leading to a reduction in power consumption of the information handling system for enhancing efficiency at the information handling system.

Specifically, this disclosure discusses a system and a method for controlling power consumption at an information handling system, including receiving, at a voltage regulator module of the information handling system, electrical power from a power supply unit (PSU), the electrical power associated with an initial voltage at a first time; determining that the information handling system is to enter a low-power state; in response to determining that the information handling system is to enter the low-power state: adjusting, by a voltage regulator module at the information handling system, an undervoltage protection (UVP) parameter for the electrical power provided to the voltage regulator module from a first voltage to a second voltage, the second voltage less than the first voltage, the second voltage based on the low-power state; adjusting, by the PSU, an overcurrent protection (OCP) parameter for the electrical power from a first amperage to a second amperage, the second amperage less than the first amperage, the second amperage based on the low-power state; trimming, by the PSU, the initial voltage of the electrical power to a trimmed voltage, the trimmed voltage less the initial voltage and greater than the second voltage; adjusting the power state of the information handling system to the low-power state; and receiving, at the voltage regulator module and when the information handling system is in the low power state, the electrical power having the trimmed voltage at a second time after the first time.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a power consumption computing module 190. The power consumption computing module 190 can be included by the memory subsystem 130. The power consumption computing module 190 can include a computer-executable program (software). The power consumption computing module 190 can be executed by the processor subsystem 120.

In short, the power consumption computing module 190 can facilitate adjustment of such parameters as an under-voltage protection (OVP) and overcurrent protection (OCP) associated with the information handling system 100 and a power supply unit (PSU) providing power to the information handling system 100. As such, the voltage provided by the PSU to the information handling system 100 can be trimmed, leading to a reduction in power consumption of the information handling system 100 for enhancing efficiency at the information handling system 100.

Figure 2:
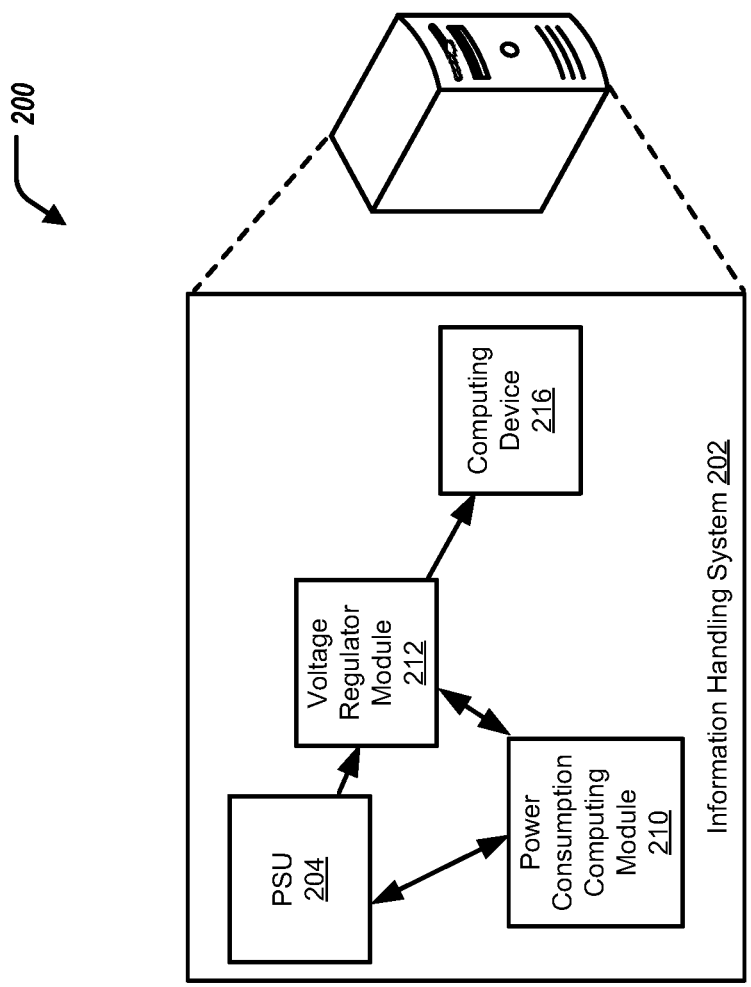
FIG. 2 illustrates a block diagram of an information handling system for controlling power consumption.

Turning to FIG. 2, FIG. 2 illustrates an environment 200 including an information handling system 202. The information handling system 202 can include a power consumption computing module 210, a voltage regulator module 212, a power supply unit (PSU) 204, and a computing device 214. In some examples, the information handling system 202 is similar to, or includes, the information handling system 100 of FIG. 1. In some examples, the power consumption computing module 210 is the same, or substantially the same, as the power consumption computing module 190 of FIG. 1.

The power consumption computing module 210 can be in communication with the voltage regulator module 212 and the PSU 204. The PSU 204 can provide power to the information handling system 202, and in particular, the voltage regulator module 212. The voltage regulator module 212 can provide power to the computing device 216. In some examples, the power consumption computing module 210 can be an embedded controller (EC), or include by the EC. The computing device 216 can include any device requiring power.

Figure 3:
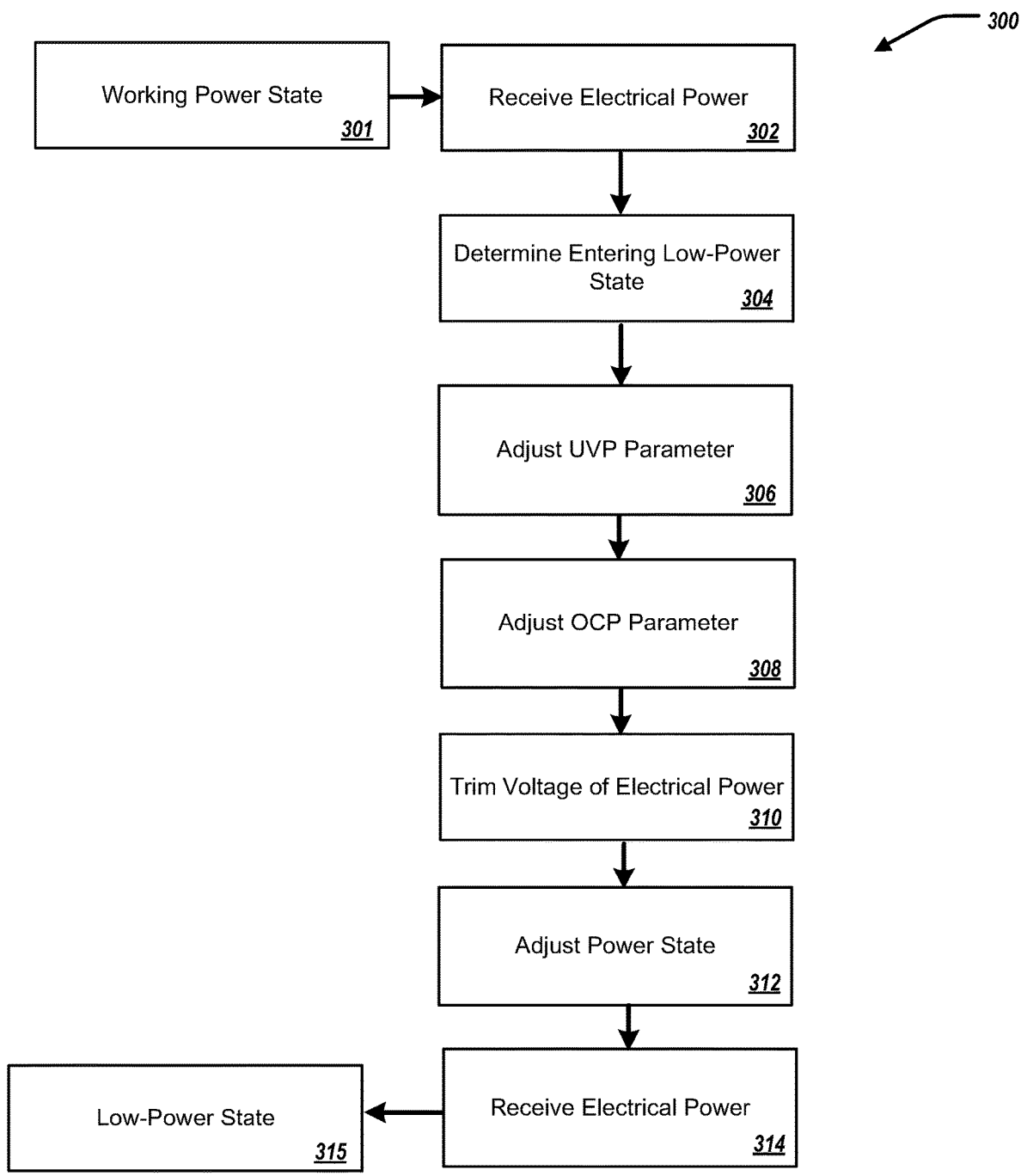
FIGS. 3 and 4 illustrates respective methods for controlling power consumption.

FIG. 3 illustrates a flowchart depicting selected elements of an embodiment of a method 300 for controlling power consumption at the information handling system 202. The method 300 may be performed by the information handling system 100, the information handling system 202, the power consumption computing module 210, the voltage regulator module 212, and/or the PSU 204, and with reference to FIGS. 1-2. It is noted that certain operations described in method 300 may be optional or may be rearranged in different embodiments.

The information handling system 202 is in the working-power state, at 301. In some examples, the working power state is a normal (nominal) state. In some examples, the working power state is an advanced configuration and power interface (ACPI) S0 state.

The voltage regulator module 212 receives electrical power from the PSU 204, at 302. The electrical power provided by the PSU 204 to the voltage regulator module 212 is associated with an initial voltage at a first time. In some examples, the initial voltage is 12 volts. In some examples, the initial voltage is 19.5 volts.

The power consumption computing module 210 can determine that the information handling system 202 is to enter a low-power state, at 304. That is, the power consumption computing module 210 can determine that the information handling system 202 is to enter a low-power state from a working power state. For example, a pin associated with the power consumption computing module 210 can be disabled (voltage level high) indicating the low-power state. In some examples, the low-power state is a sleep and/or standby state. In some examples, the low-power state is an advanced configuration and power interface (ACPI) S3 state. In some examples, the low-power state is a ACPI S5 state.

In response to determining that the information handling system 202 is to enter the low-power state, the voltage regulator module 212 adjusts an undervoltage protection (UVP) parameter for the electrical power provided to the voltage regulator module 212 from a first voltage to a second voltage, at 306. In some examples, the second voltage is less than the first voltage. For example, the first voltage can be 8.6 volts. For example, the first voltage can be 9.5 volts. For example, the second voltage can be 6 volts.

In some examples, the second voltage is based on the low-power state. That is, the value of the second voltage for the UVP is based on the voltage that the low-power state is associated with. That is, the low-power state can be associated with a respective voltage to maintain the low-power state. For example, the voltage associated with the low-power state can be 5.5 volts. The second voltage can be based on the low-power state to be greater than 5.5 volts.

Further in response to determining that the information handling system 202 is to enter the low-power state, the PSU 204 adjusts an overcurrent protection (OCP) parameter for the electrical power provided to the voltage regulator module 212 from a first amperage to a second amperage, at 308. In some examples, the second amperage is less than the first amperage.

In some examples, the second amperage is based on the low-power state. That is, the low-power state can be associated with a respective amperage to maintain the low-power state. For example, the second amperage can be 100% to approximately 140% of a required amperage to maintain the low-power state.

Further in response to determining that the information handling system 202 is to enter the low-power state, the PSU 204 trims the initial voltage of the electrical power provided to the voltage regulator module 212 to a trimmed voltage, at 310. That is, the PSU 204 trims the initial voltage of the electrical power to the trimmed voltage less than the initial voltage. For example, the trimmed voltage is 6.5 volts and the initial voltage is 12 volts. For example, the trimmed voltage is 6.5 volts and the initial voltage is 19.5 volts.

The PSU 204 trims the initial voltage of the electrical power to the trimmed voltage to reduce power consumption for enhancing efficiency at the information handling system 202.

In some examples, the trimmed voltage is greater than the second voltage. For example, the trimmed voltage is 6.5 volts and the second voltage is 6 volts.

In some examples, the trimmed voltage is less than the first voltage. For example, the trimmed voltage is 6.5 volts and the first voltage is 8.6 volts. For example, the trimmed voltage is 6.5 volts and the first voltage is 9.5 volts.

Further in response to determining that the information handling system 202 is to enter the low-power state, the power consumption computing module 210 adjusts the power state of the information handling system 202 to the low-power state, at 312. That is, the power consumption computing module 210 adjust the power state of the information handling system 202 from a ACPI S0 state to the low power state. For example, the power consumption computing module 210 adjust the power state of the information handling system 202 from a ACPI S0 state to a ACPI S3 state. For example, the power consumption computing module 210 adjusts the power state of the information handling system 202 from a ACPI S0 state to a ACPI S5 state.

The voltage regulator module 212 receives electrical power from the PSU 204 after the information handling system 202 has entered the low-power state, at 314. That is, the voltage regulator module 212 receives electrical power from the PSU 204 when the information handling system 202 is in the low power state, having the trimmed voltage at a second time after the first time. In some examples, the trimmed voltage is 6.5 volts.

The information handling system 202 is in the low-power state, at 315. In some examples, the low-power state is an ACPI S3 state. In some examples, the low-power state is an ACPI S5 state.

Figure 4:
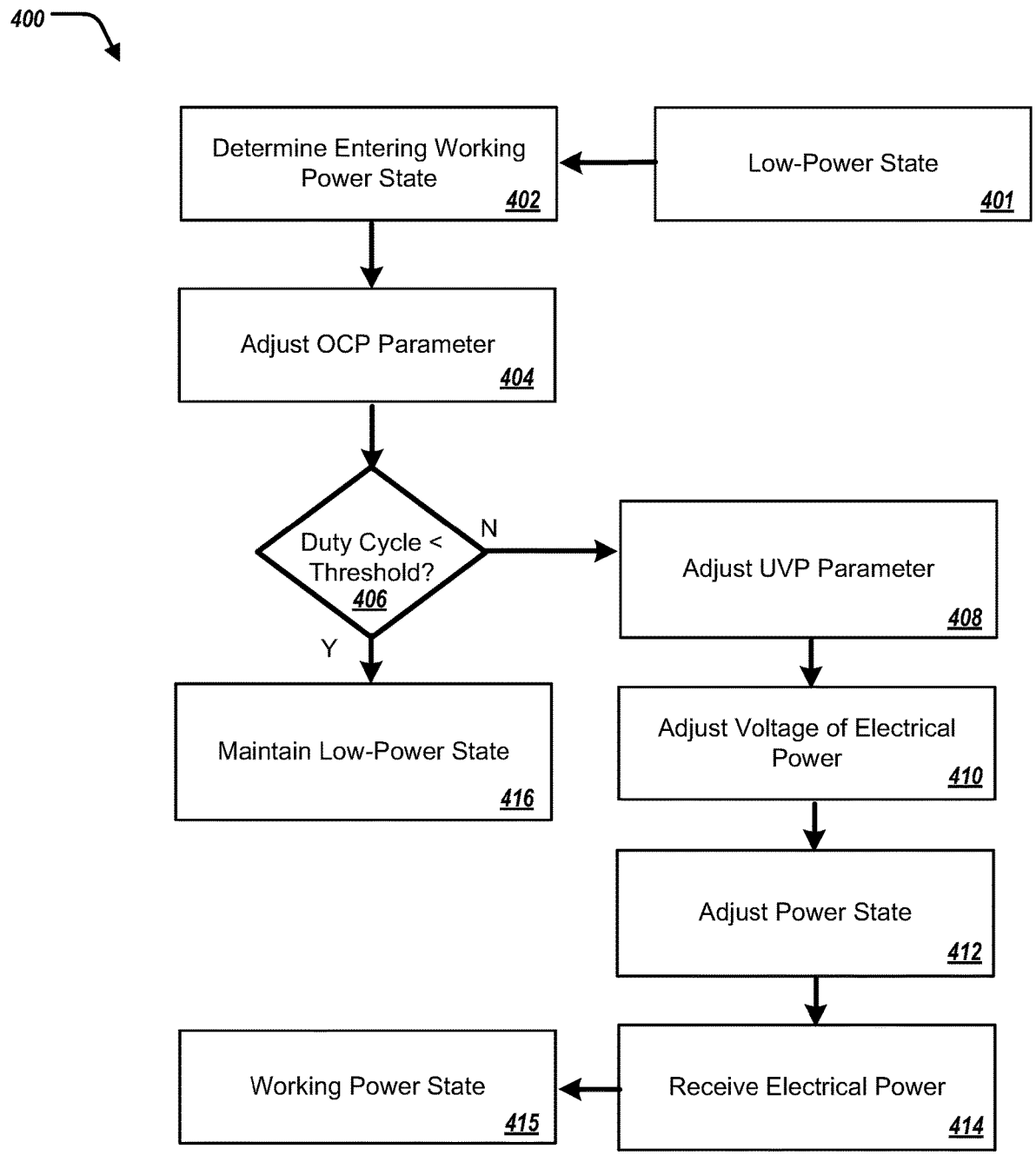

FIG. 4 illustrates a flowchart depicting selected elements of an embodiment of a method 400 for controlling power consumption at the information handling system 202. The method 400 may be performed by the information handling system 100, the information handling system 202, the power consumption computing module 210, the voltage regulator module 212, and/or the PSU 204, and with reference to FIGS. 1-2. It is noted that certain operations described in method 400 may be optional or may be rearranged in different embodiments.

The information handling system 202 is in the low-power state, at 401. In some examples, the low-power state is an ACPI S3 state. In some examples, the low-power state is an ACPI S5 state.

The power consumption computing module 210 can determine that the information handling system 202 is to enter a working-power state, at 402. That is, the power consumption computing module 210 can determine that the information handling system 202 is to enter a working power state from a low-power state. For example, a pin associated with the power consumption computing module 210 can be enabled (voltage level low) indicating the working power state. In some examples, the working power state is a normal (nominal) state. In some examples, the working power state is an advanced configuration and power interface (ACPI) S0 state.

In response to determining that the information handling system 202 is to enter the working power state, the PSU 204 adjusts the OCP parameter for the electrical power provided to the voltage regulator module 212 from the second amperage to the first amperage, at 404. In some examples, the first amperage is based on the working power state. That is, the working power state can be associated with a respective amperage to maintain the working power state. For example, the first amperage can be 100% to approximately 140% of a required amperage to maintain the working power state.

Further in response to determining that the information handling system 202 is to enter the working power state and after adjusting the OCP parameter, the power consumption computing module 210 compares a duty cycle of a signal representing the power state of the information handling system 202 to a time threshold, at 406. In some examples, the time threshold is 1 second. In some examples, the time threshold is 2 seconds.

In some cases, the power consumption computing module 210 determines, based on the comparing, that the duty cycle of the signal is greater than or equal to the time threshold. For example, the power consumption computing module 210 determines that the duty cycle of the signal is greater than or equal to two seconds.

In response to determining that the duty cycle of the signal is greater than or equal to the time threshold, the voltage regulator module 212 adjusts the UVP parameter for the electrical power provided to the voltage regulator module 212 from the second voltage to the first voltage, at 408. In some examples, the first voltage is based on the working power state. That is, the value of the first voltage for the UVP parameter is based on the voltage that the working power state is associated with. That is, the working power state can be associated with a respective voltage to maintain the working power state.

Further in response to determining that the duty cycle of the signal is greater than the time threshold, the PSU 204 adjusts the trimmed voltage of the electrical power provided to the voltage regulator module 212 to the initial voltage, at 410. That is, the PSU 204 adjusts the trimmed voltage of the electrical power back to the initial voltage.

In some examples, the initial voltage is based on the working power state. That is, the value of the initial voltage for the information handling system is based on the voltage that the working power state is associated with. That is, the working power state can be associated with a respective voltage to maintain the working power state.

Further in response to determining that the duty cycle of the signal is greater than the time threshold, the power consumption computing module 210 adjusts the power state of the information handling system 202 to the working power state, at 412. That is, the power consumption computing module 210 adjust the power state of the information handling system 202 from a ACPI S3 or S5 state to the working power state. For example, the power consumption computing module 210 adjust the power state of the information handling system 202 from a ACPI S3 state to a ACPI S0 state. For example, the power consumption computing module 210 adjusts the power state of the information handling system 202 from a ACPI S5 state to a ACPI S0 state.

Further in response to determining that the duty cycle of the signal is greater than the time threshold, the voltage regulator module 212 receives electrical power from the PSU 204 after the information handling system 202 has entered the working power state, at 414. That is, the voltage regulator module 212 receives electrical power from the PSU 204 when the information handling system 302 is in the working power state, having the initial voltage at a third time after the second time.

The information handling system 202 is in the working-power state, at 415. In some examples, the working power state is a normal (nominal) state. In some examples, the working power state is the ACPI S0 state.

In some cases, the power consumption computing module 210 determines, based on the comparing, that the duty cycle of the signal is less than the time threshold. For example, the power consumption computing module 210 determines that the duty cycle of the signal is less than two seconds.

In response to determining that the duty cycle of the signal is less than the time threshold, the power consumption computing module 210 maintains the low-power state of the information handling system, at 416.

For example, the power consumption computing module 210 maintains the power state of the information handling system 202 as the ACPI S3 state. For example, the power consumption computing module 210 maintains the power state of the information handling system 202 as the ACPI S5 state.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of controlling power consumption at an information handling system, the method comprising:
   receiving, at a voltage regulator of the information handling system, electrical power from a power supply unit (PSU), the electrical power associated with an initial voltage at a first time;
   determining that the information handling system is to enter a low-power state;
   in response to determining that the information handling system is to enter the low-power state:

adjusting, by a voltage regulator at the information handling system, an undervoltage protection (UVP) parameter for the electrical power provided to the voltage regulator from a first voltage to a second voltage, the second voltage less than the first voltage, the second voltage based on the low-power state;

adjusting, by the PSU, an overcurrent protection (OCP) parameter for the electrical power from a first amperage to a second amperage, the second amperage less than the first amperage, the second amperage based on the low-power state;

trimming, by the PSU, the initial voltage of the electrical power to a trimmed voltage, the trimmed voltage less the initial voltage and greater than the second voltage;

adjusting the power state of the information handling system to the low-power state; and receiving, at the voltage regulator and when the information handling system is in the low power state, the electrical power having the trimmed voltage at a second time after the first time.

2. The method of claim 1, wherein the low-power state is an advanced configuration and power interface (ACPI) S3 state.

3. The method of claim 1, wherein the low-power state is an advanced configuration and power interface (ACPI) S5 state.

4. The method of claim 1, wherein the trimmed voltage is less than the first voltage.

5. The method of claim 1, wherein adjusting the power state of the information handling system includes adjusting the information handling system from an advanced configuration and power interface (ACPI) S0 state to the low-power state.

6. The method of claim 1, after adjusting the power state of the information handling system, further comprising:
  determining that the information handling system is to enter a working power state;
  in response to determining that the information handling system is to enter the working power state:
  adjusting, by the PSU, the OCP parameter for the electrical power from the second amperage to the first amperage, the first amperage based on the working power state;
  adjusting, by the voltage regulator, the UVP parameter for the electrical power from the second voltage to the first voltage, the first voltage based on the working power state;
  adjusting, by the PSU, the trimmed voltage of the electrical power to the initial voltage, the initial voltage based on the working power state;
  adjusting the power state of the information handling system to the working power state; and
  receiving, at the voltage regulator, the electrical power having the initial voltage at a third time after the second time.

7. The method of claim 6, further comprising:
  after adjusting the OCP parameter, comparing a duty cycle of a signal representing the power state of the information handling system to a time threshold; and
  determining, based on the comparing, that the duty cycle of the signal is greater than the time threshold, and in response, adjusting the UVP parameter for the electrical power from the second voltage to the first voltage.

8. The method of claim 7, further comprising:
determining, based on the comparing, that the duty cycle of the signal is less than or equal to the time threshold, and in response, maintaining the low-power state of the information handling system.

9. A computing system, comprising:
a power supply unit (PSU) providing a charger voltage;
an information handling system, including:
a voltage regulator configured to receive an electrical power, the charger voltage associated with an initial voltage at a first time;
a processor having access to memory media storing instructions executable by the processor to perform operations, comprising:
determining that the information handling system is to enter a low-power state;
wherein the voltage regulator is further configured to, in response determining that the information handling system is to enter the low-power state, adjust an undervoltage protection (UVP) parameter for the electrical power provided to the voltage regulator from a first voltage to a second voltage, the second voltage less than the first voltage, the second voltage based on the low-power state,
wherein the PSU is configured to, in response determining that the information handling system is to enter the low-power state:
adjust an overcurrent protection (OCP) parameter for the electrical power from a first amperage to a second amperage, the second amperage less than the first amperage, the second amperage based on the low-power state;
trim the initial voltage of the electrical power to a trimmed voltage, the trimmed voltage less the initial voltage and greater than the second voltage; and
wherein the operations further include, in response determining that the information handling system is to enter the low-power state, adjust the power state of the information handling system to the low-power state;
wherein the voltage regulator is further configured to receive, when the information handling system is in the low power state, the electrical power having the trimmed voltage at a second time after the first time.

10. The computing system of claim 9, wherein the low-power state is an advanced configuration and power interface (ACPI) S3 state.

11. The computing system of claim 9, wherein the low-power state is an advanced configuration and power interface (ACPI) s S5 state.

12. The computing system of claim 9, wherein the trimmed voltage is less than the first voltage.

13. The computing system of claim 9, wherein adjusting the power state of the information handling system includes adjusting the information handling system from an advanced configuration and power interface (ACPI) S0 state to the low-power state.

14. The computing system of claim 9, wherein
after adjusting the power state of the information handling system, the operations further include determining that the information handling system is to enter a working power state,
wherein the voltage regulator is further configured to, in response determining that the information handling system is to enter the working power state, adjust the UVP parameter for the electrical power from the second voltage to the first voltage, the first voltage based on the working power state,
wherein the PSU is further configured to, in response determining that the information handling system is to enter the working power state, adjust the OCP parameter for the electrical power from the second amperage to the first amperage, the first amperage based on the working power state, wherein the PSU is further configured to, in response determining that the information handling system is to enter the working power state, adjust the trimmed voltage of the electrical power to the initial voltage, the initial voltage based on the working power state;

wherein the operations further include, in response determining that the information handling system is to enter the working power state, adjusting the power state of the information handling system to the working power state while the voltage regulator receives the electrical power having the initial voltage at a third time after the second time.

15. The computing system of claim 14, wherein the operations further include:

comparing a duty cycle of a signal representing the power state of the information handling system to a time threshold; and determining, based on the comparing, that the duty cycle of the signal is greater than the time threshold, wherein the voltage regulator is further configured to, in response determining that that the duty cycle of the signal is greater than the time threshold, adjust the UVP parameter for the electrical power from the second voltage to the first voltage.

16. The computing system of claim 15, wherein the operations further include:

determining, based on the comparing, that the duty cycle of the signal is less than or equal to the time threshold, maintaining, in response to determining that the duty cycle of the signal is less than or equal to the time threshold, the low-power state of the information handling system.

* * * * *